US012694174B2

(12) United States Patent (10) Patent No.: US 12,694,174 B2

Bhat (45) Date of Patent: Jul. 28, 2026

(54) METHODS FOR DIGITALLY DESIGNING PREFORMS AND MOLDING INSTRUCTIONS FOR BOTTLES

(71) Applicant: PepsiCo, Inc., Purchase, NY (US)

(72) Inventor: Advait Rasik Bhat, White Plains, NY (US)

(73) Assignee: PepsiCo, Inc., Purchase, NY (US)

( * ) Notice: Subject to any disclaimer, the term of this patent is extended or adjusted under 35 U.S.C. 154(b) by 1264 days.

(21) Appl. No.: 17/496,989

(22) Filed: Oct. 8, 2021

(65) Prior Publication Data

US 2023/0114201 A1 Apr. 13, 2023

(51) Int. Cl.
G06F 30/23 (2020.01)
B29C 49/78 (2006.01)
(Continued)

(52) U.S. Cl.
CPC .............. G06F 30/23 (2020.01); B29C 49/78 (2013.01); *B29L 2031/7158* (2013.01); *G06F 2111/10* (2020.01); *G06F 2113/22* (2020.01)

(58) Field of Classification Search
CPC .. G06F 30/23; G06F 2111/10; G06F 2113/22; B29C 49/78; B29C 2049/78715;
(Continued)

(56) References Cited

U.S. PATENT DOCUMENTS 6,973,389 B1 12/2005 Mountassir
9,321,093 B2 4/2016 Adams et al.
(Continued)

FOREIGN PATENT DOCUMENTS

CN 1455729 A 11/2003
JP H7-108595 A 4/1995
(Continued)

OTHER PUBLICATIONS

By examining Board, Signed. "3D Finite Element Modeling and Simulation of Injection Stretch Blow Molding of PET Bottle (Case Study on Aquadis Spring Water Bottle) Student Name: Wogderes G/Medhin Signature Date _." Jul. 2021. 124 pages (2021). (Year: 2021).*

(Continued)

*Primary Examiner* — Eunhee Kim
(74) *Attorney, Agent, or Firm* — Sterne, Kessler, Goldstein & Fox P.L.L.C.

(57) ABSTRACT

Methods for producing blow molding instructions for a bottle preform, including creating a first set of first blow molding experiments for blow molding a selected preform design into a target bottle design, each experiment having a different set of blow molding parameters, simulating each experiment of the first set of blow molding experiments using a simulation software program, selecting a group of experiments from the first blow molding experiments based on downselection criteria including wall thickness, section weight, and elastic modulus×wall thickness, creating a second set of blow molding experiments based on characteristics of the downselected group of first experiments, simulating each experiment of the second set of blow molding experiments using the simulation software program, selecting an experiment from the second blow molding experiments based on characteristics of the selected experiment's simulated preform and simulated blown bottle, and producing blow molding instructions based on the selected experiment.

27 Claims, 10 Drawing Sheets

(51) Int. Cl.

| | | |
|---|---|---|
| *B29L 31/00* | (2006.01) | |
| *G06F 111/10* | (2020.01) | |
| *G06F 113/22* | (2020.01) | |

(58) Field of Classification Search

CPC ....... B29C 2049/7879; B29C 49/42398; B29L
2031/7158; B29K 2067/003

See application file for complete search history.

(56) References Cited

U.S. PATENT DOCUMENTS

| | | | | |
|---|---|---|---|---|
| 2001/0028122 A1 * | 10/2001 | Narushima | ......... | B29C 33/3835 |
| | | | | 700/196 |
| 2006/0074614 A1 | 4/2006 | Chang et al. | | |

FOREIGN PATENT DOCUMENTS

| | | | |
|---|---|---|---|
| JP | 2002-307540 | A | 10/2002 |
| KR | 10-2030070 | B1 | 11/2019 |
| WO | 02/062558 | A1 | 8/2002 |

OTHER PUBLICATIONS

Bagherzadeh, S., F. R. Biglari, and K. Nikbin. "Parameter study of stretch—blow moulding process of polyethylene terephthalate bottles using finite element simulation." Proceedings of the Institution of Mechanical Engineers, Part B: Journal of Engineering Manufacture 224.8 (2010): 1217-1227. (Year: 2010).*

International Search Report and Written Opinion of the International Searching Authority directed to International Patent Application No. PCT/US2022/045666, mailed Feb. 24, 2023; 10 pages.

* cited by examiner

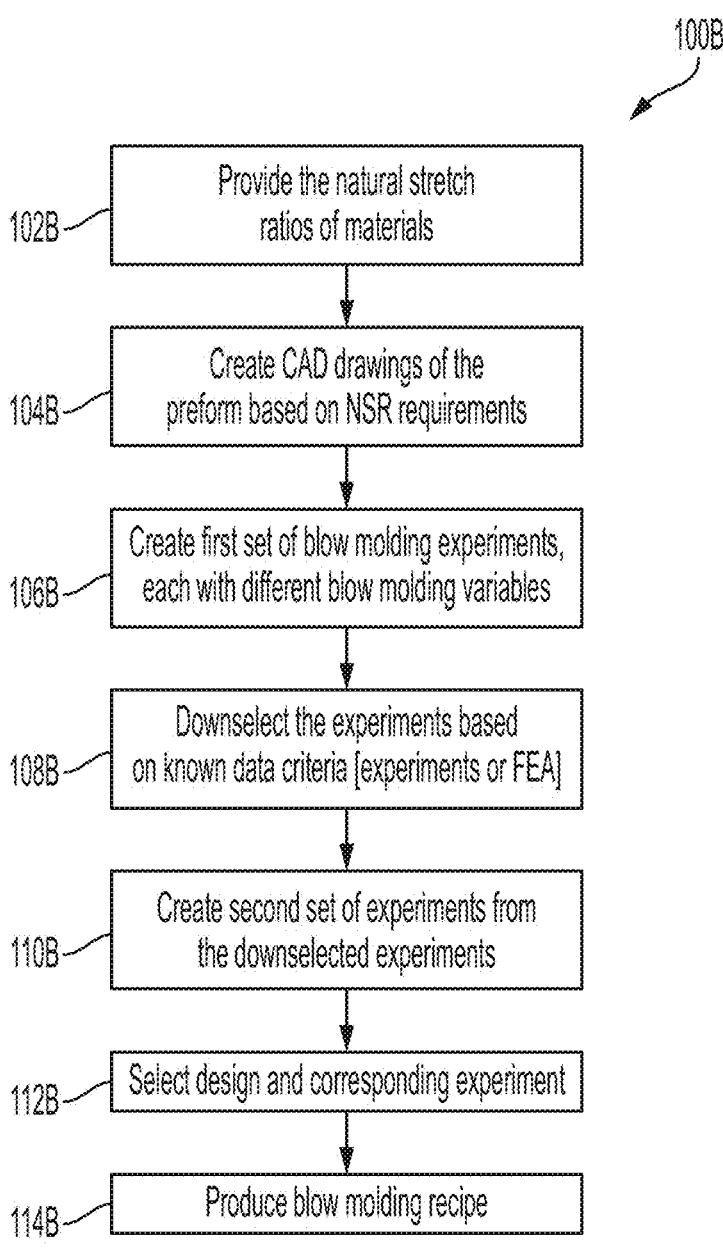

100B

102B — Provide the natural stretch ratios of materials

104B — Create CAD drawings of the preform based on NSR requirements

106B — Create first set of blow molding experiments, each with different blow molding variables 108B — Downselect the experiments based on known data criteria [experiments or FEA]

110B — Create second set of experiments from the downselected experiments

112B — Select design and corresponding experiment

114B — Produce blow molding recipe

FIG. 1B

METHODS FOR DIGITALLY DESIGNING PREFORMS AND MOLDING INSTRUCTIONS FOR BOTTLES

FIELD

Embodiments described herein generally relate to methods for digitally designing preforms for plastic bottles. Specifically, embodiments described herein relate to methods for digitally designing blow-molding parameters and preforms for producing blow-molded plastic bottles.

BACKGROUND

Plastic bottles that are commonly used to package consumer products, such as beverages, may be manufactured by blow molding bottle preforms using design criteria to produce bottles having certain dimensions and mechanical properties. In order to determine the criteria required to produce these bottles, a bottle producer may repeatedly guess and check the values of several different blow molding parameters, creating bottles and testing them for acceptable performance, which can be very time consuming and result in wasted resources.

BRIEF SUMMARY

The present disclosure is directed to digital methods for creating bottle preform designs and corresponding blow molding instructions. The methods described herein may be used to create a new bottle preform design, to select between existing preform designs, and to create corresponding blow molding instructions for both existing preforms and for new preform designs.

Some embodiments are directed to a method for producing blow molding instructions for a bottle preform, the method including: creating a first set of blow molding experiments for blow molding a selected preform design into a target bottle design, each experiment having a different set of blow molding parameters; simulating each experiment of the first set of blow molding experiments using a simulation software program; and selecting a group of experiments from the first set of blow molding experiments based on downselection criteria. The downselection criteria includes: a wall thickness of a simulated blown bottle, a section weight of the simulated blown bottle, and an elastic modulus×wall thickness of the simulated blown bottle. The method further includes creating a second set of blow molding experiments based on characteristics of the downselected group of first experiments; simulating each experiment of the second set of blow molding experiments using the simulation software program; selecting an experiment from the second set of blow molding experiments based on characteristics of the selected experiment's simulated preform and simulated blown bottle, where the characteristics of the selected experiment's simulated preform and simulated blown bottle include preform weight, simulated bottle wall thickness, and breadth of process window; and producing blow molding instructions based on the selected experiment.

In some embodiments, including any of the embodiments described above, the characteristics of the selected experiment's simulated preform and simulated blown bottle according to the previous embodiment may include simulated preform weight and simulated bottle wall thickness.

In some embodiments, including any of the embodiments described above, selecting an experiment from the second blow molding experiments according to either of the previous embodiments may also be based on a breadth of process window for producing the simulated blown bottle from the simulated preform.

In some embodiments, including any of the embodiments described above, selecting the group of experiments from the first set of blow molding experiments may include: comparing wall thickness values of the first set of experiments to an acceptable range for wall thickness to identify a first qualifying set of experiments; comparing section weight values of the first qualifying set of experiments to an acceptable range for section weight to identify a second qualifying set of experiments; and comparing elastic modulus×wall thickness values of the second qualifying set of experiments to an acceptable range for elastic modulus×wall thickness to identify a third qualifying set of experiments, wherein the third qualifying set of experiments is the group of experiments.

In some embodiments, including any of the embodiments described above, the acceptable range for wall thickness may be a minimum wall thickness determined from target thermal stability data and permeation data for a finished bottle.

In some embodiments, including any of the embodiments described above, the acceptable range for wall thickness may be a minimum section weight value determined from pressurization data for a finished bottle.

In some embodiments, including any of the embodiments described above, comparing wall thickness values may include comparing wall thickness values at multiple areas of each simulated bottle with the acceptable range for wall thickness being different for each area, and comparing section weight values may include comparing section weight values for multiple sections of each simulated bottle with the acceptable range for section weight being different for each section.

In some embodiments, including any of the embodiments described above, the blow molding parameters may include preblow pressure, melt flow rate, stretch rod speed, preblow timing, and temperature distribution.

In some embodiments, including any of the embodiments described above, the preblow pressure, melt flow rate, and stretch rod speed may be the same for all of the first of blow molding experiments, and the preblow timing and temperature distribution according to the previous embodiment may be different for at least some of the first blow molding experiments.

In some embodiments, including any of the embodiments described above, the experiment selected from the second plurality of blow molding experiments may be associated with a blow molding recipe having a broad process window.

In some embodiments, including any of the embodiments described above, the blow molding instructions may be produced based on their ability to produce a finished bottle having a wall thickness value greater than or equal to the minimum wall thickness value and a section weight value greater than or equal to the minimum section weight value.

In some embodiments, including any of the embodiments described above, the blow molding instructions may include preform temperature, preblow pressure, preblow timing, stretch rod speed, stretch rod displacement, preblow duration, blow pressure, stretch rod diameter, dead volume, air mass flow rate, mold temperature, and base mold temperature.

Some embodiments relate to a method for producing a bottle preform and a blow molding recipe for the bottle preform, the method including: creating a bottle preform design based on a natural stretch ratio of a material to be used to create the bottle preform and specifications for a bottle to be created from the bottle preform; creating a first set of blow molding experiments for blow molding the bottle preform design into a target bottle design, each experiment having a different set of blow molding parameters; simulating each experiment of the first set of blow molding experiments using a simulation software program; and selecting a group of experiments from the first set of blow molding experiments based on downselection criteria. The downselection criteria includes: a wall thickness of a simulated blown bottle, a section weight of the simulated blown bottle, and an elastic modulus×wall thickness of the simulated blown bottle. The method further includes creating a second set of blow molding experiments based on characteristics of the downselected group of first experiments, where a bottle preform inner diameter value is the same for each experiment of the second set of blow molding experiments, and where a bottle preform outer diameter value is not the same for each experiment of the second set of blow molding experiments; selecting an experiment from the second set of blow molding experiments based on characteristics of the selected experiment's simulated preform and simulated blown bottle, where the characteristics of the selected experiment's simulated preform and simulated blown bottle include preform weight, simulated bottle wall thickness, and breadth of process window; and producing blow molding instructions based on the selected experiment.

In some embodiments, including any of the embodiments described above, selecting the group of experiments from the first set of blow molding experiments includes: comparing wall thickness values of the first set of experiments to an acceptable range for wall thickness to identify a first qualifying set of experiments; comparing section weight values of the first qualifying set of experiments to an acceptable range for section weight to identify a second qualifying set of experiments; and comparing elastic modulus×wall thickness values of the second qualifying set of experiments to an acceptable range for elastic modulus×wall thickness to identify a third qualifying set of experiments, where the third qualifying set of experiments is the group of experiments.

In some embodiments, including any of the embodiments described above, the acceptable range for wall thickness is a minimum wall thickness determined from a bottle thermal stability FEA (finite element analysis) or a permeation study FEA.

In some embodiments, including any of the embodiments described above, the acceptable range for section weight is a minimum section weight according to any of the previous three embodiments is determined from a pressurization study (e.g., a pressurization study FEA) or a top load study (e.g., a top load study FEA).

In some embodiments, including any of the embodiments described above, comparing wall thickness values may include comparing wall thickness values at multiple areas of each simulated bottle, with the acceptable range for wall thickness being different for each area, and comparing section weight values may include comparing section weight values for multiple sections of each simulated bottle, with the acceptable range for section weight being different for each section.

In some embodiments, including any of the embodiments described above, the material may be a polymer blend.

In some embodiments, including any of the embodiments described above, each of the blow molding experiments of the first plurality of blow molding experiments may include constant blow molding parameters and variable blow molding parameters, where the constant blow molding parameters include preblow pressure, melt flow rate, and stretch rod speed, and where the variable blow molding parameters comprise preblow timing and temperature distribution.

In some embodiments, including any of the embodiments described above, the blow molding recipe may include preform temperature, preblow pressure, preblow timing, stretch rod speed, stretch rod displacement, preblow duration, blow pressure, stretch rod diameter, dead volume, air mass flow rate, mold temperature and base mold temperature.

In some embodiments, including any of the embodiments described above, selecting an experiment from the second blow molding experiments may also be based on a breadth of process window for producing the simulated blown bottle from the simulated preform.

Some embodiments are directed to a method for downselecting blow molding experiments, the method including: determining acceptable ranges for minimum wall thickness, section weight, and elastic modulus×wall thickness for a bottle; comparing wall thickness values of a set of bottle-blowing simulation experiments to the acceptable range for wall thickness to identify a first qualifying set of experiments; comparing section weight values of the first qualifying set of experiments to the acceptable range for section weight to identify a second qualifying set of experiments; and comparing elastic modulus×wall thickness values of the second qualifying set of experiments to the acceptable range for elastic modulus×wall thickness to identify a third qualifying set of experiments.

In some embodiments, including any of the embodiments described above, the acceptable range for wall thickness is a minimum wall thickness determined from thermal stability data and permeation data, wherein the thermal stability data and the permeation data are based on testing of a finished bottle or FEA of a simulated bottle.

In some embodiments, including any of the embodiments described above, the acceptable range for section weight may be a minimum section weight determined from pressurization data, wherein the pressurization data is based on testing of a finished bottle or FEA of a simulated bottle.

In some embodiments, including any of the embodiments described above, comparing wall thickness values may include comparing wall thickness values at multiple areas of each simulated bottle, with the acceptable range for wall thickness being different for each area, and comparing section weight values may include comparing section weight values for multiple sections of each simulated bottle, with wherein the acceptable range for section weight being different for each section.

BRIEF DESCRIPTION OF THE DRAWINGS

FIG. 1B is a diagram demonstrating a process for digitally designing a preform for a bottle according to some embodiments.

DETAILED DESCRIPTION

Figure 1A:
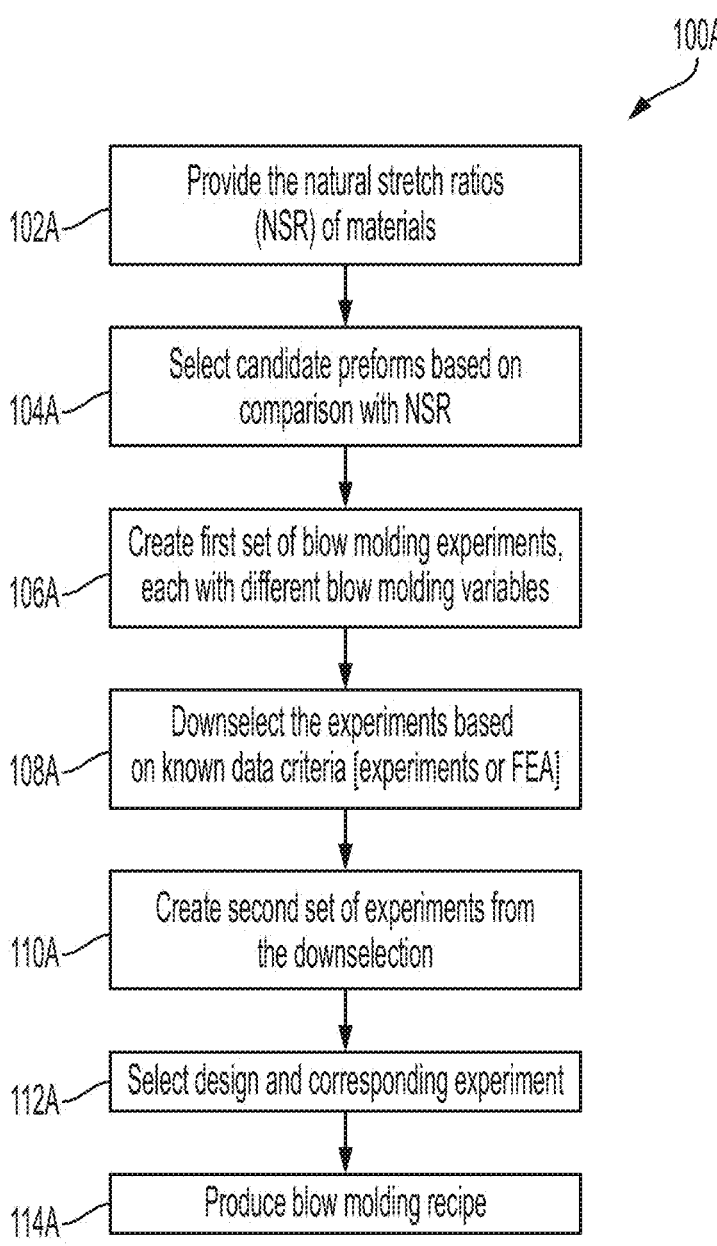
FIG. 1A is a diagram demonstrating a process for digitally selecting a design of a preform for a bottle according to some embodiments.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Plastic bottles, for example bottles used to package consumer products such as beverages, are typically manufactured by subjecting bottle preforms to blow molding processes, for example stretch blow molding processes. These blow molding processes are defined by multiple parameters that together are used to produce a target bottle design having predetermined dimensions. Often, the preforms used to produce the bottles are made from PET (polyethylene terephthalate) resins; however, alternative polymer blends may also be used to achieve certain properties in the finished bottle. When such polymer blends are used instead of PET, new blow molding processes may need to be developed, as the blow molding parameters used with the PET preforms may not be effective in producing bottles from preforms made from different polymer blends.

Existing processes for blow molding a bottle from a preform tend to be subjective and iterative. They often involve reliance on the experience of individual experts or technicians to select a preform and develop a blow-molding "recipe" of parameters to achieve a blow-molded bottle having a desired appearance and desired material distribution and performance characteristics. Even then, sample bottles are blown and tested, and often the recipe is tweaked multiple times—each time blowing and testing new sample bottles—until a satisfactory recipe is arrived at for reliably producing the desired bottles at scale.

Embodiments described herein improve on past processes by digitally simulating bottle blowing according to a variety of different sets of initial parameters (referred to as a first set of experiments), and then downselecting the results based on a set of parameters that are significant indicators of successful bottle performance. The downselected results are used to create a second set of experiments to determine a variety of parameter sets that will produce an acceptable bottle. These parameter sets can then be evaluated to select the one that best meets the goals for bottle production. This process of digital simulations reduces or eliminates wasted time, effort, and cost associated with past trial-and-error methods of bottle production.

More specifically, the first set of experiments takes as inputs: (1) preform design (e.g., defined by shape and dimensions, for example in a CAD (computer-aided design) file), (2) preform material properties, (3) bottle design (e.g., defined by shape and dimensions, for example in a CAD file), and (4) blowing parameters. All experiments in the first set have the same preform material properties and bottle design. All experiments in the first set may or may not have the same preform design. The blowing parameters vary among the experiments. Different blowing parameters result in different material distribution, which in turn results in different bottle performance characteristics.

A set of blowing parameters can be analogized to the blow-molding "recipes" developed by individual technicians described above. Blowing parameters can include, for example: preblow pressure (the pressure of preblow air, which may be blown into the preform during the blow molding process, prior to blowing blow air into the preform in order to expand the preform outward while the stretch rod stretches the preform longitudinally), stretch rod speed (the rate at which a stretch rod pushes against the bottom of the preform during the blow molding process to expand the preform longitudinally), melt flow rate (the ease of flow of the melt of the polymer during the blow molding process), preblow timing (the time at which the preblow air is activated and how long the preblow air is activated), and temperature distribution (the distribution of heat across the preform during the blow molding process).

In a first set of experiments, the blowing parameters may be grouped as (A) "constant" parameters and (B) "variable" parameters. The first experiments will be used to learn the effects of the variable parameters on bottle material distribution. For example, bottle design, preblow pressure, stretch rod speed, stretch rod diameter, and melt flow rate may be constant parameters—the same values used for each parameter for all first experiments. While preblow timing and temperature distribution may be the variable parameters, so that the preblow timing and temperature distribution may be assessed for their effect on bottle material distribution and performance characteristics.

A first set of experiments may have hundreds of different experiments, each with a different combination of variable parameters. When bottle blowing is simulated according to the first set of experiments, the resultant bottle material distribution and performance characteristics can be compared to acceptable performance value ranges for significant indicators of bottle performance, and the experiments can be "downselected" to include only those that resulted in bottles having performance values within the acceptable ranges.

Such significant indicators of bottle performance include (1) minimum wall thicknesses within selected areas, (2) minimum section weights for selected sections, and (3) elastic modulus×wall thickness. Furthermore, the downselection can occur in sequence, first considering minimum wall thicknesses within selected areas, followed by minimum section weights (e.g., for selected sections), followed by elastic modulus×wall thickness. This sequence can effectively prioritize the downselection process such that the more significant indicators of bottle performance—like minimum wall thickness—are considered early in the process.

Minimum wall thickness can be a significant indicator of the bottle's structural performance capability. For example, minimum wall thickness can be indicative of a bottle's ability to support a top load (e.g., due to bottle stacking during shipment and filling) and to accommodate internal pressure (e.g., due to expansion or contraction of the volume within a sealed bottle, which may occur as a result of pressurization or thermal expansion or contraction of material stored therein, such as beverage liquid). A bottle's structural performance capability can be dependent on the thickness of its wall in an area most susceptible to load or pressure. For example, for a set of first experiments a minimum wall thicknesses may be determined at an upper panel and at a lower panel, since these areas may tend to be the most susceptible to load or expansion pressure. The minimum wall thickness value below which insufficient load or pressure can be accommodated by the bottle can be predetermined using data collected from prior experiments or FEA.

Minimum section weight can be a significant indicator of the bottle's ability to resist unwanted deformation. For example, in the case of a bottle base having a concave base shape, a minimum base weight may be associated with a sufficient resistance to inversion due to internal pressure increases (e.g., due to thermal expansion or carbonation). The minimum section weights below which unacceptable deformation may take place can be predetermined using data collected from pressurization studies or top load studies.

Elastic modulus×wall thickness can be a significant indicator of the bottle's efficiency in material use. This is based on assumptions made according to thin-walled pressure vessel theory. It can help to identify areas of a simulated bottle where more material is used than needed to meet desired material distribution and performance characteristics. This can in turn suggest areas of the preform that can be thinned to avoid material waste.

Results from the first set of experiments can be plotted or otherwise compared to acceptable ranges for the significant indicators, and those results that fall within the acceptable ranges can be selected ("downselected") in sequence for the next stage. For example, those experiments from the first set of experiments that produce simulated bottles having minimum wall thicknesses and minimum section weights within acceptable ranges may be downselected. The second set of experiments can then be designed based on the downselected experiments from the first set.

Like the first set, the second set of experiments may also have hundreds of different experiments, each with a different combination of variable parameters. The second set of experiments can include different values for the variable parameters, and the values set for the variable parameters can be determined based on the variable parameters from the downselected experiments of the first set of experiments. For example, the values set for the variable parameters for the second set of experiments can be centered around successful variable parameter values from the first set of experiments. Bottle blowing may be simulated according to the second set of experiments. Due to the downselection process, the majority of results returned by the second set of experiments can be expected to produce bottles with acceptable material distribution and performance characteristics.

The results of the second set of experiments can then be evaluated to determine one that has an acceptably broad process window. A broad process window is one that requires less precision for a given parameter, such that bottle production equipment and operation has some room for imprecision while still making an acceptable bottle (i.e., one that meets predetermined performance characteristics, usually dependent on bottle material distribution). This can reduce waste by giving the bottle production process more flexibility. The results of the second set of experiments can allow evaluation of the breadth of process window for all blowing parameters, so that one with the best balance for an overall broad process window for successfully producing acceptable bottles can be identified and selected. The selected experiment from the second set of experiments is then used to define the successful "recipe" (i.e., set of blowing parameters) for blowing the bottle.

Another benefit of the results of the second set of experiments is that modulus×thickness can be plotted over the length of a bottle. Modulus data can be determined from material testing for the preform material, such as testing to develop a material mechanical model, as described below. Deviations in modulus×thickness that do not correspond to a maximum permissible deviation in shape of the bottle overall can indicate local areas where the bottle is thicker than needed to meet its desired material distribution and performance characteristics. (Maximum permissible deviation in shape may be a criteria set to produce bottles in accordance with desired standards (e.g., quality or performance standards).) Such deviations can indicate an opportunity to lightweight the bottle, by removing excess material from a corresponding area of the preform. The newly-designed preform can then optionally be put through the recipe-designing process again to ensure that bottles blown from it will meet desired material distribution and performance characteristics.

These and other embodiments are described below in more detail with reference to the figures.

As mentioned above, there may be multiple different desired performance characteristics for various blow molded containers, such as bottles. For example, a blow molded bottle may have a desired weight, which may be driven by a desire to use a minimal amount of plastic, while maintaining desired shape, thermal stability, top load capacity, and crystallinity, among other properties.

In particular, the degree of crystallinity of the bottle material (i.e., polymer) achieved through the blow molding process may have a significant effect on other properties of the blow molded bottles, as the level of orientation achieved by the polymer chains during the blow molding process may contribute to increased yield strength, maintained optical transparency, improved thermal stability, and increased elastic modulus.

The level of crystallinity that may be achieved by a polymer during a blow molding process may be determined by the natural stretch ratio (NSR) of the polymer. When a polymer is stretched to, but not above, its NSR, it may achieve optimal mechanical and optical properties. For example, when a polymer is stretched to its NSR, it may maintain optical transparency; however, if a polymer is stretched beyond its NSR (within a tolerance of +/−0.3), it may become opaque, which may be undesirable.

To determine the NSR of any given polymer, the polymer may be subjected to various test procedures, such as bi-axial stretch testing and instrumented free blow testing to obtain both an ideal axial stretch ratio and an ideal radial stretch ratio. Alternatively, the NSR may be calculated. Additional tests or calculations may be conducted to develop a material mechanical model. The material mechanical model may provide properties of the material including, for example, stretch ratios, temperature effects, orientation, strain rate, strain hardening, or adiabatic softening. The material mechanical model may then be validated to develop a set of material data, which may be used in the methods described herein. When a new preform design is created for a polymer blend that has not previously been used, the design may be created based on the NSR of the polymer blend, and other data of the material mechanical model.

Once the NSR of the polymer used in either an existing preform or in a new preform design is determined, one of two digital processes may be conducted to develop instructions for a blow molding process, or recipe, to produce a desired bottle or container. These digital processes may utilize CAD drawings of both a preform and the final desired container to develop a set of blow molding experiments, which may each represent a unique blow molding process. Each blow molding experiment may then be simulated using a simulation software program to determine the properties, for example wall thickness, section weights, and elastic modulus×wall thickness, of a container that would be produced using the preform and blow molding process defined by the experiment. By simulating the blow molded containers in this way, an experiment that produces a bottle with ideal dimensions and properties may be selected without the need to repeatedly modify the assumed or proposed blow molding criteria.

For example, process 100A, shown in FIG. 1A, is a block diagram representing a process for digitally optimizing the process for blowing an existing preform according to some embodiments. As mentioned above, an NSR for the polymer used to create the preform can be previously determined (step 102A). In some embodiments, the polymer used to create the preform is virgin PET. In some embodiments, the polymer used to create the preform is PET, rPET (recycled PET) PGA (polyglycolic acid), PEN (polyethylene naphthalate), or other suitable polymers, or a blend thereof. In some embodiments, fibers, such as graphene additives, may be incorporated into the polymer as well.

Once the NSR of the polymer is provided, a candidate preform may be selected (step 104A), from a group of existing preform designs, which each may be used to produce a desired final bottle. The candidate preform design may be a preform design that is already known and may be selected based on a comparison of its dimensions and dimensions of the final bottle design with the NSR of the preform material. CAD drawings for both the selected candidate preform and a final bottle to be produced by the preform may be provided to create a first set of blow molding experiments, for example at step 106A, where each experiment includes different blow molding parameters. In some embodiments, each experiment includes several constant blow molding parameters, and several variable blow molding parameters.

In some embodiments, the constant parameters include bottle design, preblow pressure, post-blow pressure, stretch rod speed, stretch rod diameter, and melt flow rate. The constant parameters can include all or a subset of these and other parameters in any combination.

Preblow pressure may refer to a pressure of preblow air, which may be blown into the preform during the blow molding process, prior to blowing blow air into the preform. The function of the preblow air may be to expand the preform outward while the stretch rod stretches the preform longitudinally. Typically, the preblow pressure is lower than the blow pressure.

Post-blow pressure (sometimes called hold pressure) may refer to an internal pressure applied when the bottle is fully inflated within the mold. It is generally higher than preblow pressure, and helps form the final shape of the bottle by pushing material into all mold surfaces.

Stretch rod speed may refer to the rate at which a stretch rod pushes against the bottom of the preform, during the blow molding process, to expand the preform longitudinally.

Melt flow rate may refer to the ease of flow of the melt of the polymer during the blow molding process. Melt flow rate can be dependent on preform temperature, mold temperature, air flow rate, and pre- and post-blow pressure.

In some embodiments, the variable parameters include preblow pressure, preblow timing, blow mold oven settings, and temperature distribution across the preform and the mold. The variable parameters can include all or a subset of these and other parameters in any combination.

The preblow timing may refer to the time at which the preblow air is activated and how long the preblow air is activated.

The temperature distribution may refer to the distribution of heat across the preform and the mold during the blow molding process. The temperature distribution on the preform may be controlled by oven infrared lamp intensities. The temperature distribution on the mold may be controlled by independent heating elements or circulation of cooling fluid.

In some embodiments, values for the constant parameters are the same for all of the experiments in the first set of blow molding experiments; however, values for the variable parameters are different for at least some of the experiments in the first set of blow molding experiments.

The first set of blow molding experiments may then be simulated using simulation software such that data for a simulated blow molded bottle may be produced. The simulation software may use a dynamic explicit FEA scheme to simulate bottle blowing. The output data for each simulated blow molded bottle may include wall thicknesses of various sections of the simulated bottle, section weights of various sections of the simulated bottle, and elastic modulus data.

Once the data for the simulated blow molded bottles is produced, the first set of blow molding experiments may be downselected, or narrowed, for example at step 108A, to include only the experiments that have produced simulated bottles with dimensions and properties that fall within acceptable ranges. A downselection process is explained in greater detail below with reference to FIG. 2.

From the downselected first set of blow molding experiments, a second set of blow molding experiments, based on characteristics of the downselected group of experiments, may be created to derive an experiment with a suitably broad process window while meeting other desired performance characteristics, for example at step 110A.

A broad process window may refer to a tolerance of at least 5% for blow molding parameters (e.g., preblow pressure, blow pressure, mold temperature). That is, the parameter can vary by at least 5% and still produce a bottle meeting predetermined performance criteria.

Figure 2:
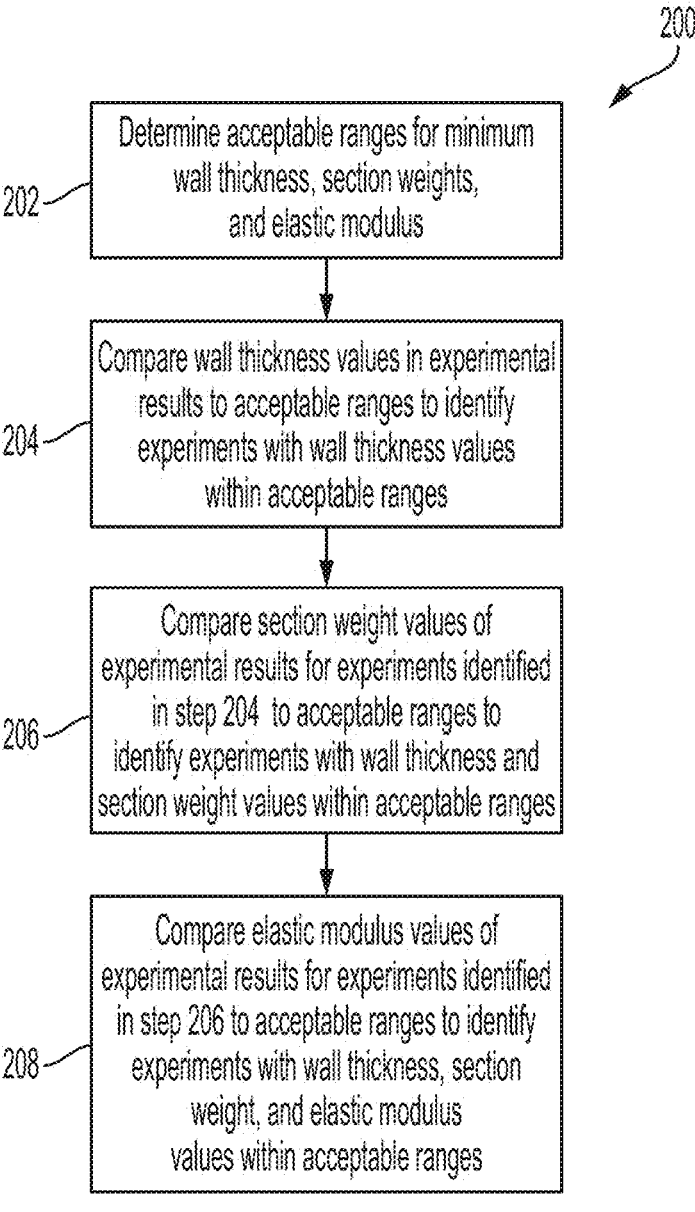
FIG. 2 is a diagram demonstrating a downselection process for selecting a blow molding experiment according to some embodiments.

A block diagram representing a downselection process is shown in FIG. 2. In some embodiments, the downselection process involves selection of experiments from the first set of experiments based on three criteria, considered in sequence: (1) minimum wall thicknesses of various sections of a simulated bottle (step 204), (2) section weights of various sections of a simulated bottle (step 206), and (3) elastic modulus×wall thickness values (step 208).

Initially, acceptable ranges for minimum wall thickness, section weight, and elastic modulus×wall thickness may be determined (step 202), for next evaluating the experimental results against.

Specifically, minimum wall thickness values for one or more of the shoulder, upper panel, lower panel, and base may be considered during the downselection process (step 204). Ensuring that the selected sections of the bottle have a certain minimum wall thickness may aid in reducing thermal expansion (which, for example, may prevent the bottles from losing their shapes when shipped from a cooler climate to a warmer climate) and maintaining structural load capacity (e.g., top load strength). Experiments that do not meet the minimum wall thickness values for the evaluated sections are disregarded before next considering section weights.

Similarly, section weights of various sections of a bottle may be considered during the downselection process (step 206). In some embodiments, as part of the downselection process, only those experiments that qualified as having acceptable wall thickness values may be evaluated for section weights. Section weights may refer to the weights of individual sections, or portions, of a bottle. The bottle may be divided into many different sections; however, typically the sections considered include a base section, a label section, a shoulder section, and a finish section. The section weight of the base of the bottle may be of particular interest during the downselection process, as inversion of the base may occur under certain pressures if its section weight is too low. Experiments that do not meet the requirements for section weights are disregarded before next considering elastic modulus.

Next, elastic modulus of the material (i.e., polymer) in the resulting bottle may be evaluated during downselection (step 208). In some embodiments, as part of the downselection process, only those experiments that qualified as having acceptable section weight values may be evaluated for elastic modulus. The elastic modulus represents the ability of the bottle to withstand deformation reversibly. Accordingly, high elastic modulus values may be desirable. In some embodiments high elastic modulus values may be accompanied by a correspondingly high strain limit to prevent the bottle from experiencing brittle failure like cracking. Therefore, modulus values may be downselected based on strength requirements of the bottle. As mentioned, in some embodiments, downselection process 200 includes first determining acceptable ranges for minimum wall thickness, section weights, and elastic modulus×wall thickness (step 202). The acceptable ranges (i.e., downselection criteria) may be derived through FEA techniques (e.g., when physical data is not available), rather than by physically conducted tests on an existing bottle.

The minimum acceptable wall thickness may be based on thermal stability data collected from thermal stability testing (whether on physical bottles or through FEA), and may be correlated with a maximal thermal expansion value for the simulated bottle. For example, the minimum acceptable wall thickness may be the minimum value that still limits thermal expansion to below a threshold acceptable level. Further, minimum wall thickness can be assessed and ranges set for certain sections of the bottle, as warranted or desired. For example, some sections of a bottle may warrant a greater wall thickness than other sections, depending on the forces that each section of the bottle may be subjected to and expected to withstand during normal use.

As mentioned above, limiting expansion (e.g., expansion of volume within a sealed container), may be significant to the performance of a completed blow molded bottle used to package consumer goods such as soft drinks. For example, if expansion is minimized, the bottle will be unlikely to swell and become distorted if it is shipped from a location having a cool climate to a location having a warmer climate, or due to pressure build-up from containing a carbonated beverage. By limiting expansion of the bottle, the bottle may maintain its aesthetic properties, may be shipped more easily, and may allow for a reduced risk of the product being damaged.

In some embodiments, the maximum acceptable expansion value may be about 3% (e.g., no more than a 3% increase in height or in width of the bottle). In some embodiments, the maximum acceptable expansion value may be about 3% (e.g., in a range of 0% to 3.5%). Such maximum acceptable expansion values may be obtained from wall thicknesses having certain minimum values, which may be dependent on the design of the bottle to be formed by the preform.

In some embodiments, minimum wall thicknesses of each section of a simulated bottle, or of an existing bottle, are determined from thickness versus expansion data acquired via shelf life studies and permeation studies conducted on the label panel of the simulated or existing bottle.

Figure 4B:
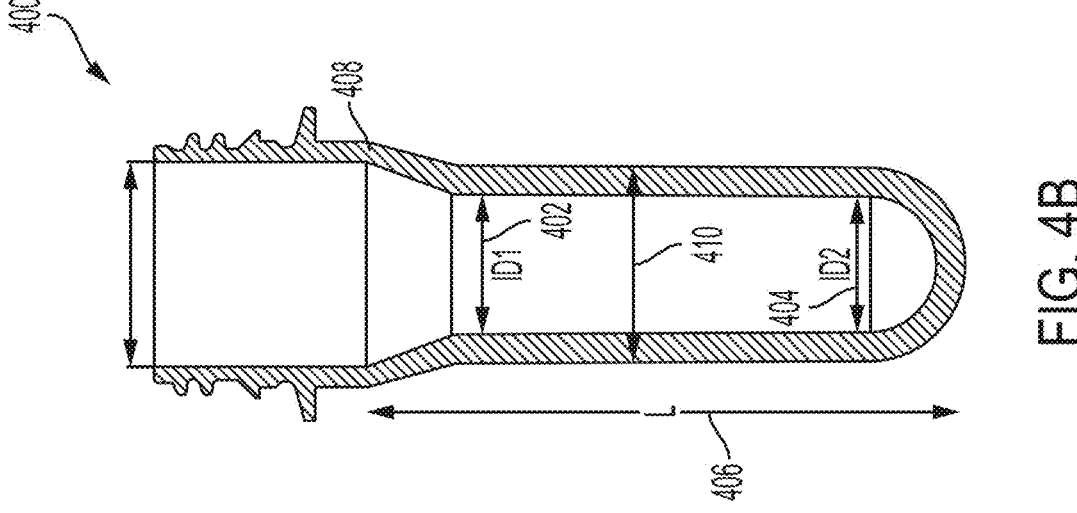
FIG. 4B is a sectional view of a preform for a bottle according to some embodiments.
Figure 4A:
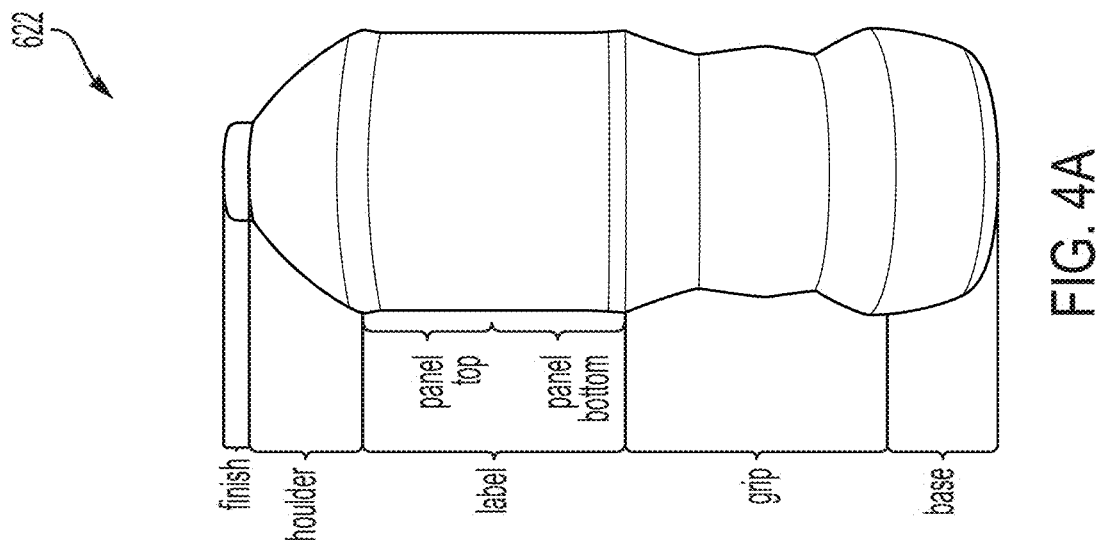
FIG. 4A is a diagram of a bottle showing example sections.

Values for acceptable section weights may also be determined (step 202). In some embodiments, values for acceptable section weights of at least one section of the simulated bottle may be determined. In some embodiments, the bottle may be sectioned into a base section, a grip section, a label section (which may be sectioned into a panel bottom section and a panel top section), a shoulder section, and a finish section, and at least one (e.g., a combination of, or all) of these sections may be determined. The bottle may also be sectioned in other ways, however, such as panel top, panel bottom, grip, and base, for example. FIG. 4A shows a reference bottle with example sections designated. In some embodiments, acceptable ranges for section weights for each section of the bottle are determined by one or more of a pressurization study or a top-load study, whether simulated (e.g., using FEA techniques such as in a pressurization study FEA or a top load study FEA) or physical (e.g., a pressurization study or a top load study conducted on an existing bottle).

In particular, the section weight of the base section may be a significant indicator of acceptable bottle performance, as a minimum base weight may help to prevent inversion of the base in the instance that the bottle is subjected to a change in pressure.

Values for acceptable elastic modulus×wall thickness may also be determined (step 202). In some embodiments the elastic modulus of the material used to create the preform is determined from existing experimental data or through mechanical testing, for example by using a uni-axial testing machine, or any other testing device capable of acquiring stress and strain measurements. The desired elastic modulus for the preform material may depend on the polymer or polymer blend that is used.

Once steps 202, 204, 206, and 208 are completed, a second set of experiments may be designed based on the experiments from the first set that successfully qualified as having acceptable wall thickness, section weight, and elastic modulus×wall thickness values.

Optionally, a further downselection step may be undertaken after step 208 and before the second set of experiments is designed, to downselect further for bottle clarity. A formula indicative of the clarity of the resulting bottle can be applied to the experimental results, and those experiments that also correspond to acceptable values for clarity may be the ones from which the second set of experiments is designed.

In some embodiments, the second set of blow molding experiments may then be simulated using simulation software to determine the characteristics of the preforms and the simulated blow molded bottles produced by each experiment. In some embodiments, the characteristics include at least the preform weight, the wall thickness of the simulated bottle, and the breadth of the process window.

From the second set of blow molding experiments, a final experiment may be selected, for example at step 112A of process 100A, and blow molding instructions may be produced, for example at step 114A, based on the selected experiment. The blow molding instructions produced using process 100A may be used to produce a blow molded bottle with the desired specifications the first time the instructions are executed, thereby eliminating the need for the trial-and-error processes that have previously been utilized. Specifically, the blow molding instructions may be produced based on their ability to produce a finished bottle having wall thickness values greater than or equal to the minimum wall thickness values and section weight values greater than or equal to the minimum section weight values, as described above.

Furthermore, modulus×wall thickness data produced for each of the experiments can help determine where an existing preform can be lightweighted. The modulus×wall thickness values of the simulated bottles may represent the ideal wall thickness values that correspond to the desired elastic modulus values of the final bottle.

In some embodiments, the blow molding instructions include at least bottle design, preform temperature, preblow pressure, post-blow pressure, preblow timing, stretch rod speed, stretch rod diameter, stretch rod displacement, preblow duration, blow pressure, stretch rod diameter, dead volume, air mass flow rate, mold temperature, and base mold temperature.

Figures 3A, 3B:
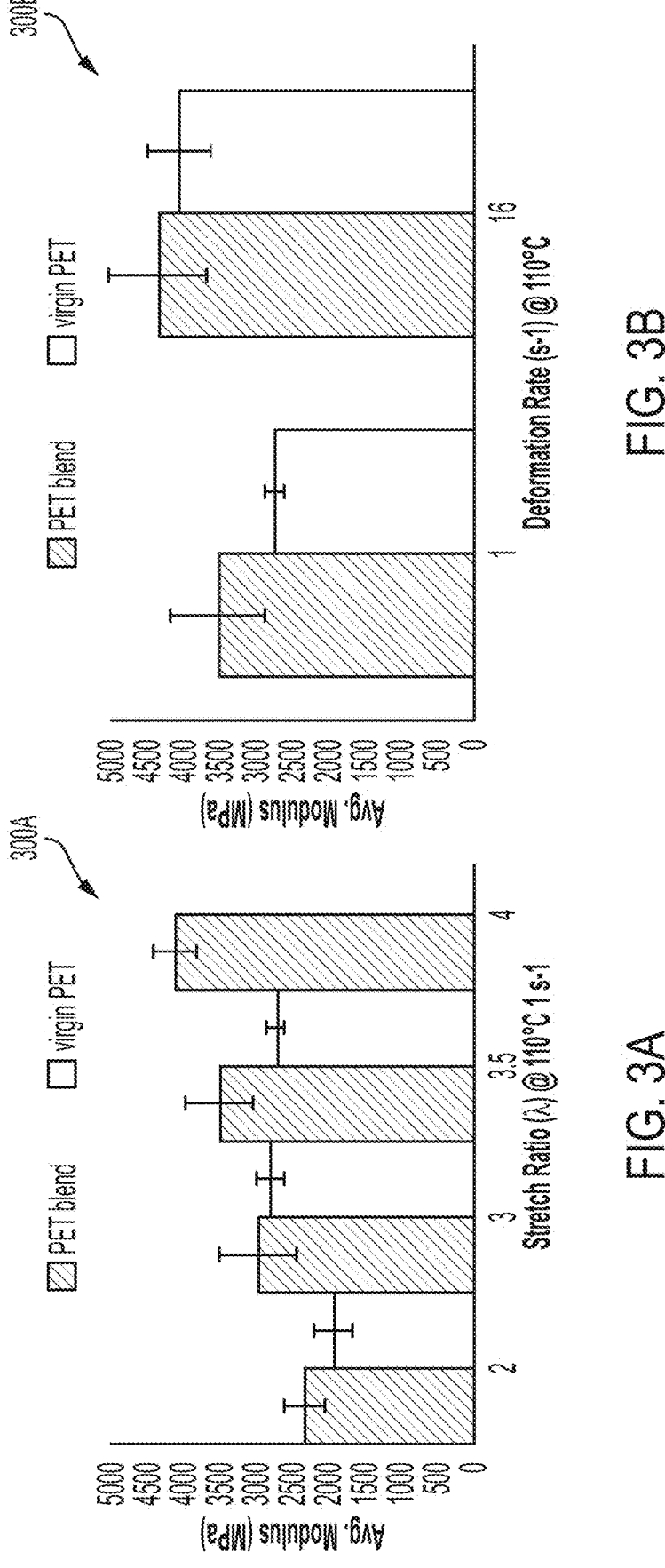
FIG. 3A is a chart demonstrating the average elastic modulus versus the stretch ratio of a polymer blend and a virgin PET material according to some embodiments.
FIG. 3B is a chart demonstrating the average elastic modulus versus the deformation rate of the polymer blend of FIG. 3A and the virgin PET material of FIG. 3A.

As mentioned previously, digital methods may also be used to produce blow molding instructions for new preform designs, as well. Typically, virgin PET is used to produce bottle preforms; however, it may be desirable to use PET blends, or other polymer blends in new preform designs. The new PET or other polymer blends may have different NSRs than current in-use PET, which may provide the opportunity or need for a new preform design customized to account for the NSR of the material. For example, as shown in FIGS. 3A and 3B, plots 300A and 300B show the average modulus versus stretch ratio and the average modulus versus deformation rate, respectively, of virgin PET as compared to a PET blend (i.e., PET blended with another polymer). Plots 300A and 300B demonstrate that the PET blend exhibits higher average modulus values for all stretch ratios and for all deformation rates, which may be beneficial in creating a more durable bottle.

In some embodiments, a process may be used to digitally design a new preform and associated blow molding instructions for a desired bottle. In some embodiments, the new preform design of process 100B may utilize a new polymer blend. Like in process 100A the NSR of the polymer or polymer blend used to create the bottle preform is determined (step 102B). A CAD drawing of the new preform design may be created (step 104B), and a CAD drawing of the final bottle to be produced using the blow molding instructions may be provided. The CAD drawing of the preform may be created based on dimensions of the final bottle design and the NSR of the preform material.

At step 106B, for example, a first set of blow molding experiments may then be created, each having different blow molding parameters. For example, as discussed above, in some embodiments, each experiment includes several constant blow molding parameters, and several variable blow molding parameters.

In some embodiments, the constant parameters include bottle design, preblow pressure, post-blow pressure, stretch rod speed, stretch rod diameter, and melt flow rate. The constant parameters can include all or a subset of these and other parameters in any combination. In some embodiments, the variable parameters include preblow pressure, preblow timing, bow mold oven settings, and temperature distribution across the preform and the mold. The variable parameters can include all or a subset of these and other parameters in any combination.

The first set of blow molding experiments may then be simulated using simulation software to produce simulated blow molded bottles, each having certain wall thicknesses, section weights, and elastic moduli. The simulation software may use a dynamic explicit FEA scheme to simulate bottle blowing. At step 108B the first set of blow molding experiments may be downselected, for example according to downselection process 200, described above, to determine a second set of blow molding experiments. Based on the results of the downselection process (step 108B), a preform inner diameter may be identified and set (e.g., as a constant parameter for the second set of experiments). At step 110B, process 100B differs from process 100A, for example, because, since the new preform design has not yet been determined, the outer diameter of the preform remains variable. For example, as shown in FIG. 4B, preform design 400 may include a first inner diameter 402, a second inner diameter 404, a preform length 406, a neck section 408, and an outer diameter 410. The dimensions of first inner diameter 402, second inner diameter 404, preform length 406, and neck section 408, may be set (e.g., based on existing preform designs). However, outer diameter 410 may be unknown because the new preform design, which may be made from a previously unused polymer blend, may not have ever been used to actually blow mold a bottle. Accordingly, outer diameter values for the preforms, which may determine the desired dimensions and properties of the finished bottle, need to be established. Therefore, at step 110B, a second set of blow molding experiments may be created, where each experiment includes a different outer diameter value.

Figure 8:
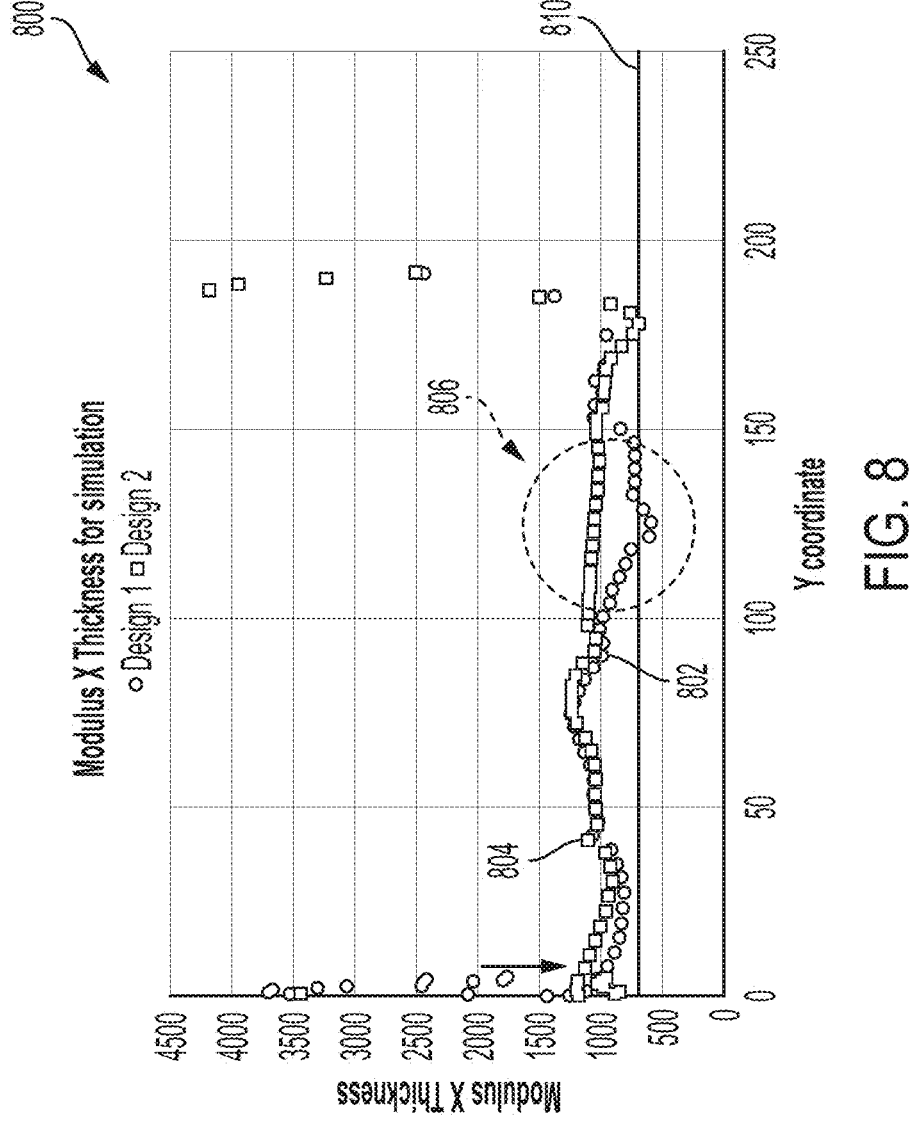
FIG. 8 shows a plot demonstrating a modulus×thickness profile for bottles produced using various preform designs according to some embodiments.
Figure 9:
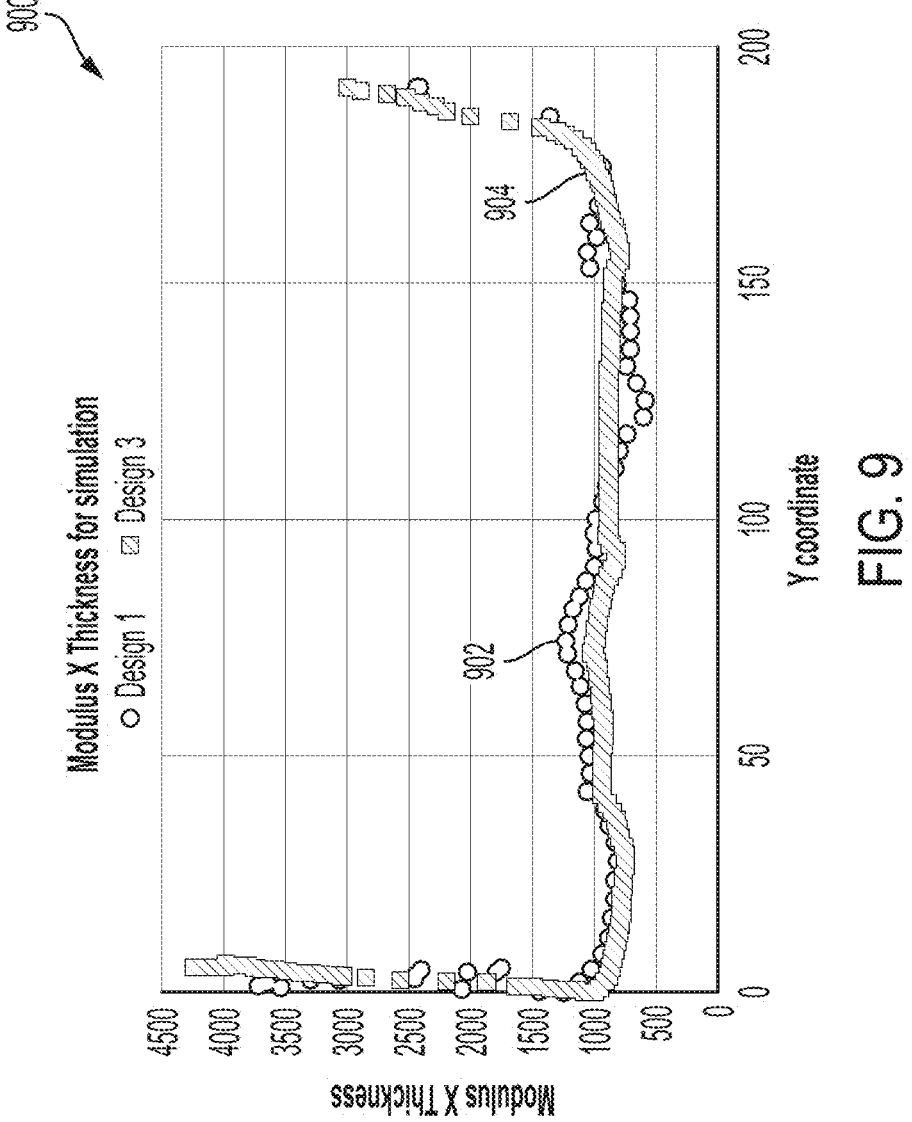
FIG. 9 shows a plot demonstrating a modulus×thickness profile for bottles produced using various preform designs according to some embodiments.

The second set of blow molding experiments may be based on the downselected results of the first set of experiments and may be simulated using simulation software, to produce a second set of simulated blow molded bottles. Each of the simulated bottles may then be evaluated to determine its modulus×wall thickness values using a modulus×thickness plot, for example as shown in FIGS. 8 and 9. The modulus×wall thickness values of the simulated bottles may represent the ideal wall thickness values which correspond to the desired elastic modulus values of the final bottle. In some embodiments, the shape of the curve of the modulus× thickness plot may correspond to the contours of the simulated blow molded bottle.

Accordingly, an experiment may be selected (step 112B) from the second set of blow molding experiments, which includes preferable modulus×wall thickness values, and provides for a broad process window, as previously described. Blow molding instructions may be produced (step 114B) based on the selected experiment.

Figure 5:
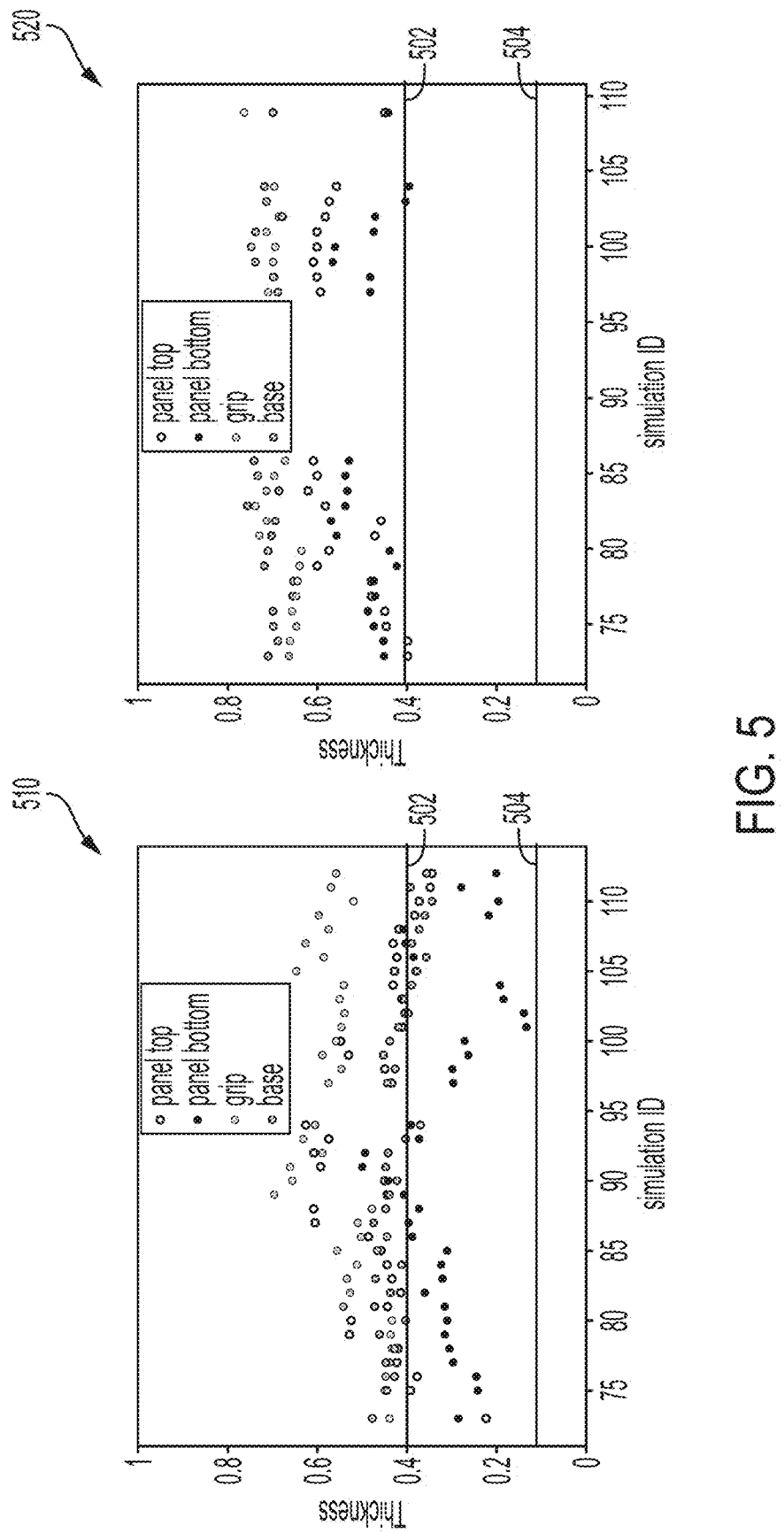
FIG. 5 shows plots demonstrating wall thickness distributions for various blow molding experiments according to some embodiments.
Figure 6:
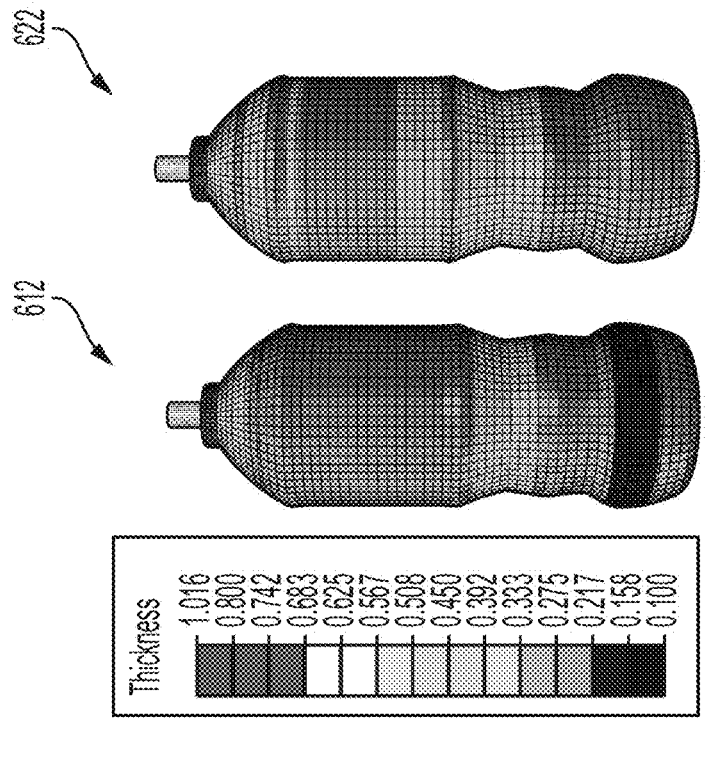
FIG. 6 shows a plot demonstrating a wall thickness profile for a polymer blend and corresponding finite element analysis diagrams demonstrating the wall thickness profiles for bottles produced using various preform designs according to some embodiments.
Figure 6:
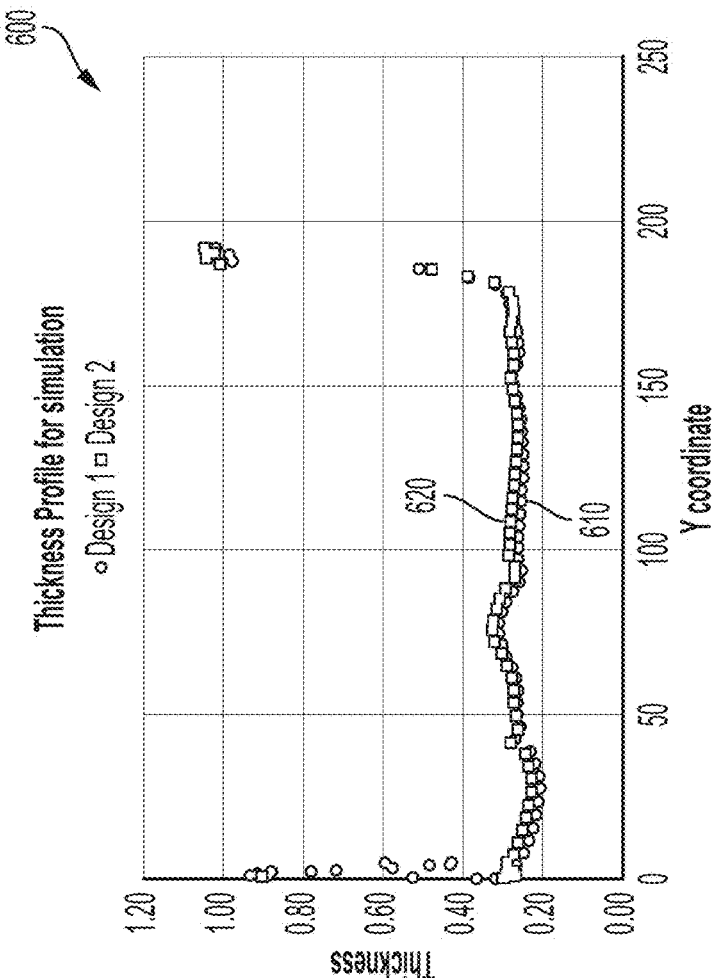
Figure 7:
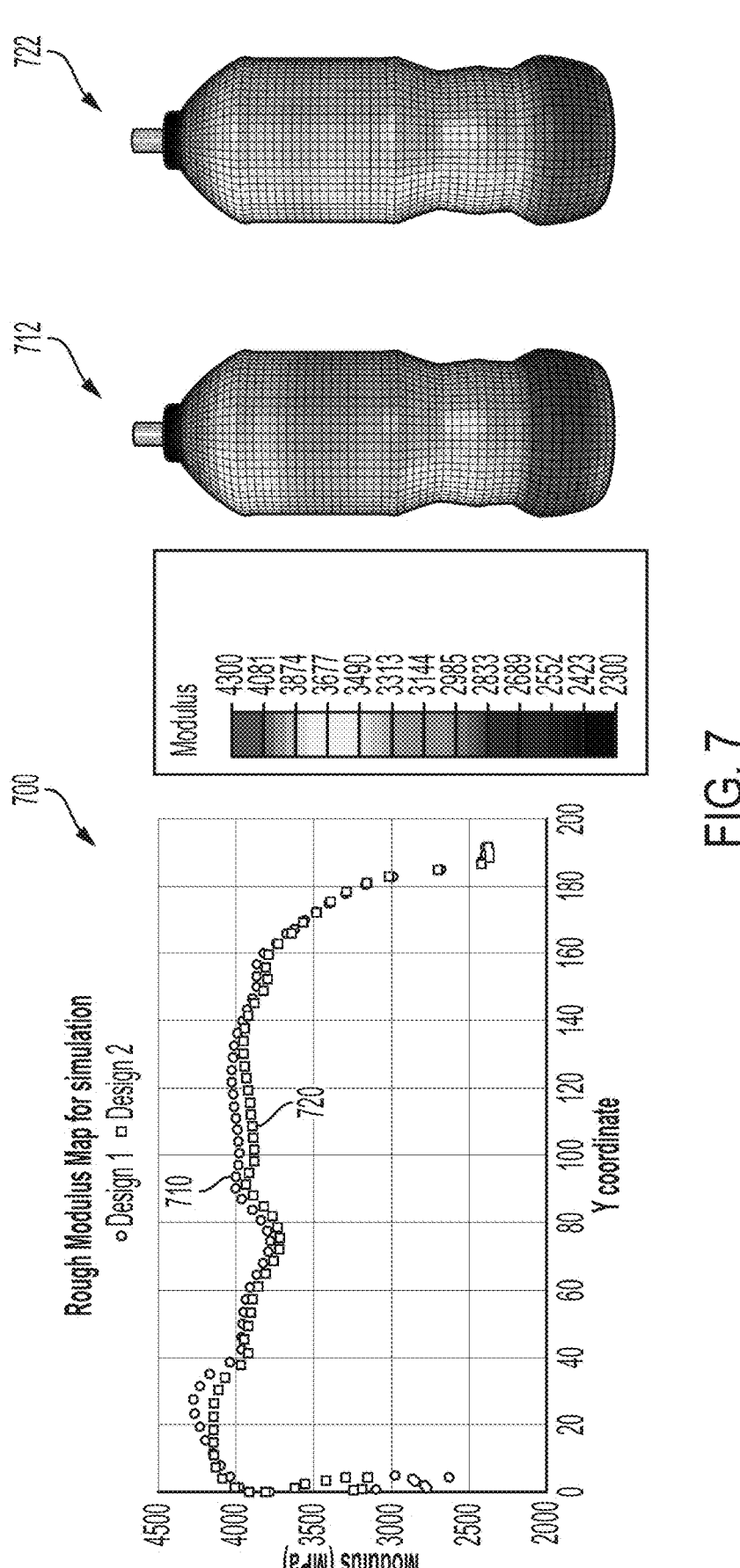
FIG. 7 shows a plot demonstrating a modulus profile for a polymer blend and corresponding finite element analysis diagrams demonstrating the modulus profiles for bottles produced using various preform designs according to some embodiments.

FIGS. 5-7 demonstrate the capability of the processes described herein in producing blow molding instructions for producing bottles from various preforms.

For example, plot 510, shown in FIG. 5, shows the wall thickness distributions for an existing preform design, while plot 520 shows the wall thickness distributions for a preform designed using the methods described herein. Thickness can be determined at multiple locations simultaneously (e.g., two, three, four, five, or six locations). For example, as shown in FIG. 5, thickness is determined in four consistent locations, designated as panel top, panel bottom, grip, and base. As shown, the newly-designed preform exhibits wall thicknesses that are largely greater than both the minimum wall thickness 504, determined by shelf life and permeation studies, and the minimum wall thickness 502, determined by thermal stability testing over all simulated experiments.

Furthermore, plot 600, shown in FIG. 6, shows a thickness profile 620 for an experiment selected using the methods described herein versus a thickness profile 610 for a previously-existing preform design. As shown, the thickness values for the selected experiment are greater than those for the previously-existing preform design. Furthermore, the thickness distributions for the design taken from the previously-existing preform design and the selected design shown in the FEA renderings 612 and 622, respectively, demonstrate a more even thickness distribution in rendering 622, with no thin spots present in the base of the simulated bottle.

Similarly, plot 700, shown in FIG. 7, shows a modulus profile 720 for the selected experiment versus the thickness profile 712 for the previously-existing design. Although the modulus values for the selected experiment are not as high as the modulus values for the previously-existing design at every point along the plot, the overall modulus distribution is much more even, for example as shown by FEA renderings 712 and 722, which represent the previously-existing design and the selected experiment, respectively.

The efficacy of the disclosed processes is further shown, for example in plot 800 of FIG. 8, for example, which demonstrates the modulus×wall thickness profiles 802 and 804 of the previously-existing preform design and the downselected experiment, respectively, according to some embodiments. As shown in plot 800, the modulus×wall thickness profile 804, which represents the downselected experiment, is much more evenly distributed and constant than modulus×wall thickness profile 802, which represents the previously-existing preform design. Accordingly, a bottle produced by the final downselected experiment is likely to have even thickness and modulus values throughout, while a bottle produced from the previously-existing preform design is likely to have some sections with wall thicknesses that are too thin, or which have elastic modulus values that are too low.

Another way of looking at the data of FIG. 8 is that the modulus×wall thickness profile 804 is greater than a predetermined minimum value (represented by line 810) in certain areas along its height, which may be determined via a prior FEA. For example, prior FEA relating to a pressure burst test may reveal that modulus×wall thickness should remain above 750 (represented by minimum acceptable value line 810 in FIG. 8) between 100 mm and 150 mm of the bottle height.

Comparing existing-preform-profile 802 and downselected-experiment-profile 804 shows a significant deviation at 806 in FIG. 8, and shows that modulus×wall thickness of existing-preform-profile 802 drops below the predetermined minimum value line 810. This highlights an area 806 where a corresponding portion of the existing preform can be modified in thickness to bring it closer to the downselected-experiment profile to achieve improved performance.

And, as shown in plot 900 of FIG. 9, for example, at area 906, there is a gap between curve 902, which represents a bottle formed from an existing preform design, and curve 904, which represents a preform used in a downselected experiment. Gap 906 demonstrates that, using the downselected experiment, the existing preform design may be modified to reduce the amount of material at the point on the curve 902 that corresponds to gap 906, since there is more material in that area than is needed to meet the bottle's desired material distribution and performance characteristics.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for producing blow molding instructions for a bottle preform, the method comprising:
   creating a first set of blow molding experiments for blow molding a preform design into a target bottle design, each experiment having a different set of blow molding parameters;
   simulating each experiment of the first set of blow molding experiments using a simulation software program;
   selecting a group of experiments from the first set of blow molding experiments based on downselection criteria, wherein the downselection criteria comprises:
       a wall thickness of a simulated blown bottle,
       a section weight of the simulated blown bottle, and
       an elastic modulus×wall thickness value of the simulated blown bottle;
   creating a second set of blow molding experiments based on characteristics of the downselected group of first experiments;
   simulating each experiment of the second set of blow molding experiments using the simulation software program;
   selecting an experiment from the second set of blow molding experiments based on characteristics of the selected experiment's simulated preform and simulated blown bottle, wherein the characteristics of the selected experiment's simulated preform and simulated blown bottle include preform weight, simulated bottle wall thickness, and breadth of process window; and producing blow molding instructions based on the selected experiment.

2. The method of claim 1, wherein the characteristics of the selected experiment's simulated preform and simulated blown bottle comprise simulated preform weight and simulated bottle wall thickness.

3. The method of claim 2, wherein selecting an experiment from the second set of blow molding experiments is also based on a breadth of process window for producing the simulated blown bottle from the simulated preform.

4. The method of claim 1, wherein selecting the group of experiments from the first set of blow molding experiments comprises:

comparing wall thickness values of the first set of experiments to an acceptable range for wall thickness to identify a first qualifying set of experiments;

comparing section weight values of the first qualifying set of experiments to an acceptable range for section weight to identify a second qualifying set of experiments; and comparing elastic modulus×wall thickness values of the second qualifying set of experiments to an acceptable range for elastic modulus×wall thickness to identify a third qualifying set of experiments, and wherein the third qualifying set of experiments is the group of experiments.

5. The method of claim 4, wherein the acceptable range for wall thickness is a minimum wall thickness determined from target thermal stability data and permeation data for a finished bottle.

6. The method of claim 4, wherein the acceptable range for section weight is a minimum section weight determined from pressurization data for a finished bottle.

7. The method of claim 4, wherein comparing wall thickness values comprises comparing wall thickness values at multiple areas of each simulated bottle, and wherein the acceptable range for wall thickness is different for each area, and wherein comparing section weight values comprises comparing section weight values for multiple sections of each simulated bottle, and wherein the acceptable range for section weight is different for each section.

8. The method of claim 1, wherein the blow molding parameters comprise:

preblow pressure;

melt flow rate;

stretch rod speed;

preblow timing; and temperature distribution.

9. The method of claim 8, wherein preblow pressure, melt flow rate, and stretch rod speed are the same for all of the first set of blow molding experiments, and wherein preblow timing and temperature distribution are different for at least some experiments of the first set of blow molding experiments.

10. The method of claim 1, wherein the experiment selected from the second set of blow molding experiments is associated with a blow molding recipe having a broad process window.

11. The method of claim 1, wherein the blow molding instructions are produced based on the blow molding instructions' ability to produce a finished bottle having a wall thickness value greater than or equal to the minimum wall thickness value and a section weight value greater than or equal to the minimum section weight value.

12. The method of claim 1, wherein the blow molding instructions comprise:

preform temperature;

preblow pressure;

preblow timing;

stretch rod speed;

stretch rod displacement;

preblow duration;

blow pressure;

stretch rod diameter;

dead volume;

air mass flow rate;

mold temperature; and base mold temperature.

13. A method of manufacturing a bottle, the method comprising blow molding a bottle according to the blow molding instructions produced in claim 1.

14. A method for producing a bottle preform and a blow molding recipe for the bottle preform, the method comprising:

creating a bottle preform design based on a natural stretch ratio of a material to be used to create the bottle preform and specifications for a bottle to be created from the bottle preform;

creating a first set of blow molding experiments for blow molding the bottle preform design into a target bottle design, each experiment having a different set of blow molding parameters;

simulating each experiment of the first set of blow molding experiments using a simulation software program;

selecting a group of experiments from the first set of blow molding experiments based on downselection criteria, wherein the downselection criteria comprises:

a wall thickness of a simulated blown bottle, a section weight of the simulated blown bottle, and an elastic modulus×wall thickness value of the simulated blown bottle;

creating a second set of blow molding experiments based on characteristics of the downselected group of first experiments, wherein a bottle preform inner diameter value is the same for each experiment of the second set of blow molding experiments, and wherein a bottle preform outer diameter value is not the same for each experiment of the second set of blow molding experiments;

selecting an experiment from the second set of blow molding experiments based on characteristics of the selected experiment's simulated preform and simulated blown bottle, wherein the characteristics of the selected experiment's simulated preform and simulated blown bottle include preform weight, simulated bottle wall thickness, and breadth of process window; and producing blow molding instructions based on the selected experiment.

15. The method of claim 14, wherein selecting the group of experiments from the first set of blow molding experiments comprises:

comparing wall thickness values of the first set of experiments to an acceptable range for wall thickness to identify a first qualifying set of experiments;

comparing section weight values of the first qualifying set of experiments to an acceptable range for section weight to identify a second qualifying set of experiments; and comparing elastic modulus×wall thickness values of the second qualifying set of experiments to an acceptable range for elastic modulus×wall thickness to identify a third qualifying set of experiments, and wherein the third qualifying set of experiments is the group of experiments.

16. The method of claim 15, wherein the acceptable range for wall thickness is a minimum wall thickness determined from a bottle thermal stability FEA (finite element analysis) or a permeation study FEA.

17. The method of claim 15, wherein the acceptable range for section weight is a minimum section weight determined from a pressurization study or a top load study.

18. The method of claim 15, wherein comparing wall thickness values comprises comparing wall thickness values at multiple areas of each simulated bottle, and wherein the acceptable range for wall thickness is different for each area, and wherein comparing section weight values comprises comparing section weight values for multiple sections of each simulated bottle, and wherein the acceptable range for section weight is different for each section.

19. The method of claim 14, wherein the material comprises a polymer blend.

20. The method of claim 14, wherein each of the blow molding experiments of the first set of blow molding experiments comprises constant blow molding parameters and variable blow molding parameters, wherein the constant blow molding parameters comprise preblow pressure, melt flow rate, and stretch rod speed, and wherein the variable blow molding parameters comprise preblow timing and temperature distribution.

21. The method of claim 14, wherein the blow molding recipe comprises:

preform temperature;
preblow pressure;
preblow timing;
stretch rod speed;
stretch rod displacement;
preblow duration;
blow pressure;
stretch rod diameter;
dead volume;
air mass flow rate;
mold temperature; and
base mold temperature.

22. The method of claim 14, wherein selecting an experiment from the second set of blow molding experiments is also based on a breadth of process window for producing the simulated blown bottle from the simulated preform.

23. A method for creating blow molding experiments, the method comprising:

a downselecting method comprising:

determining acceptable ranges for minimum wall thickness, section weight, and elastic modulus×wall thickness for a bottle, comparing wall thickness values of a first set of bottle-blowing simulation experiments to the acceptable range for wall thickness to identify a first qualifying set of experiments, comparing section weight values of the first qualifying set of experiments to the acceptable range for section weight to identify a second qualifying set of experiments, and comparing elastic modulus×wall thickness values of the second qualifying set of experiments to the acceptable range for elastic modulus×wall thickness to identify a third qualifying set of experiments; and creating a second set of blow molding experiments based on characteristics of the third qualifying set of experiments.

24. The method of claim 23, wherein the acceptable range for wall thickness is a minimum wall thickness determined from thermal stability data and permeation data, wherein the thermal stability data and the permeation data are based on testing of a finished bottle or FEA (finite element analysis) of a simulated bottle.

25. The method of claim 23, wherein the acceptable range for section weight is a minimum section weight determined from pressurization data, wherein the pressurization data is based on testing of a finished bottle or FEA (finite element analysis) of a simulated bottle.

26. The method of claim 23, wherein comparing wall thickness values comprises comparing wall thickness values at multiple areas of each simulated bottle, and wherein the acceptable range for wall thickness is different for each area, and wherein comparing section weight values comprises comparing section weight values for multiple sections of each simulated bottle, and wherein the acceptable range for section weight is different for each section.

27. A method for producing blow molding instructions for a bottle preform, the method comprising:

creating the second set of blow molding experiments according to the method of claim 23; and creating blow molding instructions based on a selected experiment from among the second set of blow molding experiments.

* * * * *